United States Patent
Freeman et al.

(10) Patent No.: US 6,716,912 B2
(45) Date of Patent: Apr. 6, 2004

(54) POLYMERIC BINDERS FOR WATER-RESISTANT INK JET INKS

(75) Inventors: Michael Bennett Freeman, Harleysville, PA (US); Eric Jon Langenmayr, Bryn Mawr, PA (US); Thomas Glenn Madle, Flourtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/727,324

(22) Filed: Nov. 30, 2000

(65) Prior Publication Data

US 2002/0065347 A1 May 30, 2002

Related U.S. Application Data

(60) Provisional application No. 60/170,608, filed on Dec. 14, 1999.

(51) Int. Cl.$^7$ .......................... C08L 33/02; C08L 33/08; C08L 33/10; C08L 25/04; C08F 220/06
(52) U.S. Cl. ...................... 524/824; 524/833; 526/318.4
(58) Field of Search .................... 523/160, 161; 524/824, 833, 458, 460; 526/72, 318.4, 328.5, 329.2, 329.7

(56) References Cited

U.S. PATENT DOCUMENTS

| | | | |
|---|---|---|---|
| 4,267,091 A | * 5/1981 | Geelhaar et al. ............. 524/189 |
| 4,334,932 A | 6/1982 | Roueche | |
| 4,780,503 A | * 10/1988 | Mallya ........................ 524/460 |
| 5,221,334 A | 6/1993 | Ma et al. | |
| 5,503,664 A | 4/1996 | Sano et al. | |
| 5,510,314 A | 4/1996 | Evans et al. | |
| 5,523,335 A | 6/1996 | Whyzmuzis et al. | |
| 5,622,778 A | * 4/1997 | Horii et al. ................. 442/118 |
| 5,631,309 A | 5/1997 | Yanagi et al. | |
| 5,679,724 A | 10/1997 | Sacripante et al. | |
| 5,712,338 A | 1/1998 | Donovan et al. | |
| 5,714,538 A | 2/1998 | Beach et al. | |
| 5,764,262 A | 6/1998 | Wu et al. | |
| 5,814,685 A | 9/1998 | Satake et al. | |
| 5,821,283 A | 10/1998 | Hester et al. | |
| 5,912,280 A | 6/1999 | Anton et al. | |
| 5,959,024 A | * 9/1999 | Farwaha et al. ............. 524/716 |
| 5,990,221 A | * 11/1999 | Dames et al. ................ 524/457 |
| 6,063,834 A | 5/2000 | Kappele et al. | |
| 6,646,024 B2 | * 11/2003 | Beach et al. ................. 523/160 |

FOREIGN PATENT DOCUMENTS

| | | |
|---|---|---|
| EP | 0455379 A | 6/1991 |
| EP | 0590604 A | 6/1994 |
| EP | 0704303 A1 | 4/1996 |
| EP | 0735120 A2 | 10/1996 |
| EP | 0571190 B1 | 1/1997 |
| EP | 0796901 A2 | 9/1997 |
| EP | 0851010 A1 | 7/1998 |
| EP | 0851011 A2 | 7/1998 |
| EP | 0851012 A2 | 7/1998 |
| EP | 0851013 A2 | 7/1998 |
| EP | 0851014 A2 | 7/1998 |
| EP | 0857768 A2 | 8/1998 |
| EP | 0859037 A1 | 8/1998 |
| EP | 0867484 A2 | 9/1998 |
| EP | 0869160 A2 | 10/1998 |
| EP | 0875544 A1 | 11/1998 |
| EP | 0877065 A1 | 11/1998 |
| EP | 0878522 A1 | 11/1998 |
| EP | 0882771 A2 | 12/1998 |
| EP | 0887391 A1 | 12/1998 |
| EP | 0857768 A3 | 1/1999 |
| EP | 0960919 A | 1/1999 |
| EP | 0704303 B1 | 7/2000 |
| WO | WO 98/51749 | 11/1998 |
| WO | WO 99/23183 | 5/1999 |
| WO | WO 01/44386 | * 6/2001 |

OTHER PUBLICATIONS

European Search Report, Application #EP 00 31 0632 (Mar. 2001).

* cited by examiner

*Primary Examiner*—Callie Shosho
(74) *Attorney, Agent, or Firm*—Karl Stauss

(57) ABSTRACT

The present invention comprises a polymeric binder for water-resistant ink jet inks, wherein the binder has an acid component in the range from about 1 to about 10 wt. % of the polymer, a glass transition temperature in the range from about −20° C. to about 25° C., and an average particle diameter in the range from about 250 to about 400 nm and a particle size distribution such that essentially all the particles have a diameter in the range from 130 to 450 nm. The binder comprises monomers selected from the group consisting of acrylates, methacrylates, styrene, substituted styrene, fluoromethacrylates, vinyl acrylates, vinyl acetates, acrylamides, substituted acrylamides, methacrylamides, substituted methacrylamides, or combinations thereof.

8 Claims, No Drawings

POLYMERIC BINDERS FOR WATER-RESISTANT INK JET INKS

CROSS REFERENCE TO RELATED PATENT APPLICATIONS

This is a non-provisional application of prior pending U.S. provisional application serial No. 60/170,608 filed Dec. 14, 1999.

This invention relates to binders for water-resistant ink jet inks. More specifically, this invention relates to polymeric binders for use in ink jet ink applications, wherein the binder has suitable particle size, charge and glass transition temperature such that the resulting inks have good printability, do not clog the ink jet printer heads and form a water-resistant ink when applied to a print surface.

Certain ink jet inks comprise a liquid medium, a colorant, such as a pigment or dye, a binder or resin to aid in dispersing the pigment in the medium and to affix the colorant to the print surface. In order to create more durable print quality, particularly in terms of color-fastness and water- and rub-resistance of the printing ink, there has been interest in preparing ink jet inks in which the colorant is an insoluble pigment, rather than a water soluble dye. The latter are generally absorbed to some degree by the paper or other print medium, but due to their inherent water-solubility do not offer good waterfastness. Pigment-based inks are generally deposited on the surface of the print medium, making them susceptible to removal by water or abrasion. However, they are comprised of hard particles and do not form films. Nevertheless, these inks can exhibit improved waterfastness compared to dyes since they are inherently insoluble in water.

As a result of the physical properties of pigments, pigment based ink compositions have a tendency to dry smear, have low resistance to wet-rub and have low highlighter resistance. The term "dry smear," as used herein, means applying abrasive pressure across the printed substrate and measuring any smear created thereby. The term "wet-rub," as used herein, means applying a drop of water to the printed substrate followed by applying abrasive pressure across the printed substrate and measuring any smear created thereby; wet-rub differs from waterfastness because abrasion is used. The term "highlighter resistance," as used herein, means applying abrasive pressure across the printed substrate with a commercially available highlighting marker and measuring any smear created thereby; an example of such marker is Sanford Corp. Major Accent brand highlighting markers. To solve this problem, the present invention was developed to provide a polymeric binder for use with a colorant to form an ink composition that improves the resistance of the printed ink to dry smear and wet-rub and provides better highlighter resistance when the ink is jetted onto the substrate. The binders of the present invention have been used in ink formulations which have demonstrated the ability to resist smearing upon dry smear and wet-rub as well as increased highlighter resistance.

Polymers have been added to inkjet ink compositions to improve durability, to improve print quality and to reduce color bleeding and feathering. However, the inclusion of polymers has resulted in increased printhead maintenance problems, including clogging of the nozzles and kogation, i.e. formation of film on or about the heater. Also, polymers may tend to form films on the nozzle plate. The addition of polymers to ink compositions also may cause decreased pigment dispersion stability and interference with bubble formation. Existing inventions have attempted to address the problems, such as kogation, clogging and other malfunctioning of the printhead, that result from the incorporation of polymers into ink compositions.

Satake et al., U.S. Pat. No. 5,814,685 (hereinafter referred to as "Satake") disclose an ink composition in which pigment and a resin are dispersed in an aqueous medium. Satake further teaches that the resin is a polymeric core/shell material with a Tg of the core in the range of from −100 to 40° C., and a Tg of the shell in the range from 50 to 150° C., and an average particle size of 20 to 200 nm. Satake teaches that particle size greater than 200 nm causes increased maintenance problems.

Kappele et al., U.S. patent application Ser. No. 08/987,185, disclose wet-rub resistant ink compositions. Kappele teaches an ink composition utilizing specific copolymers and/or terpolymers as binders, which encapsulate or cover the colorants and form a film on the substrate when the ink is jetted.

Sacripante et al., U.S. Pat. No. 5,679,724, disclose an ink for inkjet printing including a pigment and an emulsifiable polymer resin. Further, Sacripante discloses a Tg range of 10 to 100° C., preferably 35 to 80° C. Sacripante teaches that if the Tg is too low, the print media becomes sticky.

Anton et al., U.S. Pat. No. 5,912,280, disclose an ink composition utilizing a core/shell emulsion polymer with a pigment as the colorant. Further, Anton teaches adding core/shell emulsion polymers to inks containing insoluble colorants in effective quantities to improve waterfastness. Anton illustrates a core/shell emulsion polymer containing two distinct phases having different Tg, i.e. one phase has a Tg above ambient temperature and the other phase has a Tg below ambient temperature.

Fujisawa et al., European Patent Application No. 704 303 A1, disclose an ink composition comprising a colorant, a thermoplastic resin and water. Fujisawa teaches that the thermoplastic resin has a Tg of 50 to 150° C. Fujisawa further teaches that the particle diameter of the thermoplastic resin is less than 300 nm, preferably 50 to 200 nm.

Kubota et al., European Patent Application No. 887 391, disclose an ink composition which comprises a colorant, an inorganic oxide colloid, an alkali metal hydroxide and an aqueous solvent. Kubota teaches including a resin emulsion having a particle size less than 150 nm, preferably 5 to 100 nm.

Nichols et al., European Patent Application No. 869 160 A2, disclose an inkjet ink formulation with colorant, vehicle and resin emulsion containing ionic carboxylic groups on the surface of resin emulsion particles to cause disassociation of the colorant and resin particles. The resin has 1 to 40 wt. % "carboxylic acid groups", and Tg of 0 to 120° C. Exemplified embodiments of the resin include copolymers of butyl acrylate, methyl methacrylate and (meth)acrylic acid, with 3 to 20 wt. % acid, Tg of 53 to 95° C. and particle size of 63 to 235 nm, utilizing high Tgs and low particle sizes. The inks are said to have good water resistance, but the tests used only assessed passive water bleed, and did not assess the commercially critical wet-rub resistance or highlighter resistance.

As illustrated by Satake, Fujisawa and Kubota, prior research in this area teaches that smaller binder particles, generally less than about 200 nm average diameter, are preferred, presumably as a result of anticipating lowered maintenance problems such as clogging of the ink jet printhead nozzles. As illustrated by Sacripante and Fujisawa, prior research teaches that the apparent Tg of the binder should be significantly above ambient temperature (i.e., above about 25° C.) to avoid maintenance problems such as kogation.

As illustrated by Kappele and Anton, prior research teaches that resistance to wet-rub may be incorporated into inks by utilizing certain polymer resins or core/shell polymer emulsions.

As identified above, the challenge and problem presented by the prior art are to develop an inkjet ink binder which will remain dispersed in the complete inkjet ink formulation, will not clog the printer head nozzle or other aspects of the print mechanism, will form a film or other means to bind the ink jet pigment together and onto the surface of the paper or other print medium, and will provide a printed ink which is wet-rub, dry smear, scrub and highlighter resistant. The present invention solves all of these problems by use of a polymeric binder as described herein.

Contrary to accepted research and knowledge, the present invention provides a polymeric binder for an ink composition comprising a colorant and a polymeric binder wherein the polymeric binder has an average particle diameter of greater than 250 nm, a below ambient Tg in the range from −20 to 25° C., and an acid component content of 1% to 10% by weight of the binder. Unlike the binders described above, the present invention provides binders for inkjet inks with improved resistance to dry smear, improved resistance to wet-rub, and improved highlighter resistance without creating the printhead maintenance problems of kogation and clogging.

The present invention comprises a polymeric binder suitable for use in inkjet ink formulations, which has a Tg of −20° C. to 25° C., an average particle diameter of 250 to 400 nm, and an acid component at 1 to 10 weight percent of the binder. For use in a conventional printer, the Tg is preferably in the range from −10 to 20° C. Preferably, the acid component is present at a level of 1 to 3 weight percent of the binder. In one embodiment, the binder comprises a single stage polymer with a narrow particle size distribution (PSD), preferably a PSD with particle diameters in the range from 130 to 450 nm. The polymer of the present invention has the extraordinary and unexpected properties when used as an ink binder, of providing an inkjet ink composition which successfully adheres to the substrate without experiencing wet-rub or dry smear, with increased highlighter resistance and without causing increased printhead maintenance problems due to clogging, kogating and other malfunctioning of the nozzles.

The present invention is a polymeric binder system suitable for use in ink jet ink formulations in which the colorant is either a dye or a pigment. The invention has particular application in aqueous ink jet ink formulations where the colorant is a pigment, for example, an insoluble organic or inorganic pigment. The pigments may be dispersed in a dispersant or formed as a self-dispersed pigment system.

The binder comprises a polymer with a glass transition temperature (Tg) in the range from −20 to 25° C., an average particle size (diameter) of 250 to 400 nm, and an acid content of 1 to 10 weight percent (wt. %) of the binder polymer. In a preferred embodiment, the acid content is in the range from 1 to 7 weight percent of the binder polymer, more preferably 1 to 3 weight percent of the binder polymer. Preferably, the binder polymer has a Tg in the range from −10 to 20° C. and an average particle size of 275 to 350 nm. In conjunction with the compositional parameters of the binder, this Tg and particle size range define an effective binder for use in inkjet ink formulations. In a preferred embodiment, the polymer comprises a single stage polymer with an average diameter in the range from 250 to 400 nm and a particle size distribution such that essentially all of the particles fall between 130 and 450 nm in diameter.

The polymeric binder of the present invention comprises a polymer or copolymer formed from monomer classes, including, but not limited to: acrylate esters, methacrylate esters, styrenes, substituted styrenes, vinyl acrylates, vinyl acetates, fluoromethacrylates, acrylamides, substituted acrylamides, methacrylamides, substituted methacrylamides, and combinations thereof. Among the esters of acrylic acid and methacrylic acid, preferred monomers include alkyl esters including but not limited to methyl acrylate, ethyl acrylate, propyl acrylate, butyl acrylate, lauryl acrylate, methyl methacrylate, ethyl methacrylate, propyl methacrylate, butyl methacrylate, lauryl methacrylate, isobutylene methacrylate. In one embodiment, the binder comprises copolymer of methyl methacrylate and alkyl acrylate, such as butyl acrylate.

The polymeric binder further comprises an acid component. The acid component may comprise acrylic acid, methacrylic acid, itaconic acid, vinyl sulfonic acid, maleic acids or combinations thereof, or may be derived from salts or anhydrides of such acids, such as methacrylic or maleic anhydride or sodium vinylsulfonate or acrylamidopropane sulfonate. A preferred acid component is methacrylic acid alone or in combination with another acid.

The binder comprises 1 to 10 weight percent (wt. %), preferably from 1 to 7 wt. %, more preferably from 1 to 3 wt. %, acid component, relative to the total weight of the polymeric binder. When the acid component is methacrylic acid, the acid level is preferably 1.1 to 1.5 wt. %; more preferably about 1.3 wt. %. In one preferred embodiment, the binder comprises a co-polymer of 20 to 40 wt. % methyl methacrylate and 60 to 80 wt. % butyl acrylate. More preferably, the binder comprises 27 to 33 wt. % methyl methacrylate and about 66 to 72 wt. % butyl acrylate. In another embodiment, the binder comprises 10 to 50 wt. % methyl methacrylate, 50 to 85 wt. % butyl acrylate, and 3 to 10 wt. % methacrylic acid, based on the total weight of the polymeric binder; for example, 14.5 wt. % methyl methacrylate, 80.5 wt. % butyl acrylate, and 5 wt. % methacrylic acid. The foregoing merely represent examples of suitable binder compositions. The binders of the invention comprise polymer or copolymers with from 1 to 10 wt. % acid component, based on the total weight of the polymeric binder.

A critical element of the binder of the present invention is that it has a Tg in the range from −20° C. to 25° C. Contrary to art expectations, in below ambient temperatures (i.e., below about 25° C.), the polymeric binder is suitable for use in conventional (i.e., thermal or piezoelectric) inkjet ink printers, for example Lexmark 7000, Lexmark 5700, Lexmark Z51 and Lexmark 2050 printers, the Epson Stylus 3000 printer and the Hewlett-Packard Deskjet 694C printer. The Tgs of the polymers or copolymers formed from the monomers used in the present invention are well known and are readily determinable from standard references. Preferably, the Tg of the binder is in the range from −10 to 20° C.; more preferably, −10 to 10° C. At these glass transition temperatures, the binder is believed to form an adhesive film, continuous or otherwise, between the pigment/dye and the paper or other print medium as the aqueous ink medium dissipates by evaporation, absorption by the print medium or otherwise. When the adhesive polymer is not continuous so as to constitute a true film, the adhesive effect may be achieved through "spot welds" in which sufficient polymer is present to adhere one or more colorant particles to the print media.

The polymer particles comprising the binder have an average diameter in the range from 250 to 400 nm; preferably 275 to 350 nm, more preferably 275 to 300 nm. Contrary to the general principle that smaller polymer particles, especially particles with average diameter less than 230 nm, are less likely to cause printhead maintenance problems, we have found that binder with polymer particles in the range from 250 to 400 nm provided better overall printability than binders with smaller particle sizes.

The particle size distribution of the binder polymer may be unimodal, bimodal or polymodal, provided that the particle size distribution (PSD) of the polymeric binder particles is such that essentially all the particles fall in the range from 130 to 450 nm in diameter. In one embodiment of the invention, the binder polymer has a bimodal particle size distribution where, preferably, the small size particles have an average diameter in the range from 175 to 260 nm, and the large size particles have an average diameter in the range from 260 to 400 nm, and the average particle size is within the range from about 250 to 400 nm. In another embodiment of the invention, the binder polymer has a unimodal particle size distribution with an average diameter in the range from 250 to 400 nm. Preferably, the binder has a unimodal particle size distribution with an average diameter in the range from 275 to 350 nm, more preferably 275 to 300 nm; and a particle size distribution such that essentially all the particles fall in the range from 130 to 450 nm. The average particle size and particle size distribution may be determined by the capillary hydrodynamic fractionation (CHDF) technique as is known in the art.

The molecular weight of the polymeric binder is not critical. However, it has been found that the binder polymers preferably has a molecular weight in the range from 10,000 to 2,000,000 Da; more preferably, 50,000 to 1,000,000 Da. The molecular weight as used herein is defined as the weight average molecular weight and may be determined by gel permeation chromatography in THF as solvent. The surface tension of the binders of the invention are generally in the range from 30 to 60 dynes/cm or somewhat greater. For most applications, it is preferable that surface tension be fairly high; i.e. in the range from 35 to 55 dynes/cm.

The binder of the present invention may further comprise additional components which do not substantially alter the characteristics described above, including without limitation process aids such as surfactants (emulsifiers), protective colloids, and other stabilizers known to those skilled in the art, basic components and biocidal components. Suitable surfactants, for example, include sodium lauryl sulfate, sodium dodecylbenzene sulfonate, sodium dioctyl sulfosuccinate, and ammonium perfluroralkyl sulfonates, Triton X-100, Triton X-405, and polyoxyethylenated polyoxypropylene glycols.

The binder may be prepared by a conventional persulfate-initiated thermal process known in the art such as batch, semi-batch, gradual addition or continuous. Other suitable initiators may be used alternatively. The monomers are polymerized to preferably greater than 99% conversion and then the reaction is cooled to room temperature (20–25° C.) after the addition of the appropriate amount of neutralizing base to control pH. The pH is adjusted to between pH 7 and 10, more preferably between pH 8 and 9, with neutralizer such as, for example, ammonia, sodium hydroxide, potassium hydroxide or combinations of these neutralizers. Preferably, potassium hydroxide is used as neutralizer.

The preparation processes used have been found to be well suited to the preparation of binders of the present invention. They allow for controlled particle size and particle size distribution (PSD), at a low acid level, and a suitable glass transition temperature for the resulting binder.

The binder may be incorporated in an inkjet ink formulation comprising, for example, pigment, binder and an aqueous medium. Preferably, the binder is present at a level of 0.1 to 10 weight percent, preferably, 0.5 to 5 weight percent, more preferably 1 to 5 weight percent relative to the total weight of the ink formulation. The aqueous carrier may be water; preferably, deionized water. In one embodiment, the aqueous carrier is present at from 40% to 95%, preferably from 55% to 80%, most preferably, from 70% to 80% by weight of the ink composition. Selection of a suitable mixture for the ink composition using the binder of the present invention depends upon the requirements of the specific ink being formulated, such as the desired surface tension and viscosity, the pigment used, the drying time required for the pigmented ink and the type of paper onto which the ink will be printed.

The ink composition using the binder of the present invention may also include water miscible materials such as humectants, dispersants, penetrants, chelating agents, buffers, biocides, fungicides, bacteriocides, surfactants, anti-curling agents, anti-bleed agents and surface tension modifiers, all as is known in the art. Useful humectants include ethylene glycol, 1,3 propanediol, 1,4 butanediol, 1,4 cyclohexanedimethanol, 1,5 pentanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, 2-pyrrolidone, 1-methyl-2-pyrrolidone, 1-methyl-2-piperidone, N-ethylacetamide, N-methylpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, sorbital, pantothenol, Liponic EG-1. Preferred humectants are polyethylene glycol with average molecular weight of 400 to 1000, 2-pyrrolidone 2,2 thiodiethanol, and 1,5 pentanediol. Preferred penetrants are 1,2 alkyl diols of from 1 to 4 carbon atoms forming the alkyl such as 1,2 hexanediol, and others such as N-propanol, isopropyl alcohol, and hexyl carbitol, and others as more fully disclosed in U.S. Pat. No. 5,364,461 to Beach et al., which disclosure is incorporated by reference herein.

Examples of pigments useful in the method of the present invention include organic pigments such as azo compounds, phthalocyanine pigments, quinacridone pigments, anthraquinone pigments, dioxazine pigments, indigo, thioindigo pigments, perynone pigments, perylene pigments, isoindolene, and in general, any organic pigment useful in inkjet printing. Also useful are inorganic pigments such as carbon black, titanium dioxide, iron oxide, metal powders, and in general, any inorganic pigment useful in inkjet printing. The amount of pigment is generally determined by the desired properties of the ink to be made. Generally, the amount of pigments used is less that 10% and is typically from 3–8% by weight based on the total weight of all the components of the ink. The pigment particle size must be sufficiently small that pigment particles will not clog the nozzles on the printing device in which the ink is to be used. Typical nozzle openings on thermal ink jet printers are 30–60 microns in diameter. Preferably, the pigment particle size is from 0.05 to 5 microns, more preferably not more than one micron and most preferably not more than 0.3 microns.

Suitable inkjet ink formulations may comprise a dispersant. The dispersant polymer typically contains a hydrophilic portion for water solubility and a hydrophobic portion because surfaces of many pigments are relatively non-polar. Many different dispersant compositions which meet the needs to provide a stable pigmented ink jet ink are known in the art, for example, U.S. Pat. No. 5,821,283 (Rohm and Haas), U.S. Pat. No. 5,221,334 (DuPont), U.S. Pat. No. 5,712,338 (DuPont), and U.S. Pat. No. 5,714,538 (Lexmark). Alternatively, a self-dispersed pigment system may be employed. For the purposes of this invention, the polymeric dispersant composition is not critical as long as its use results in a stable and printable ink. Polymer dispersants are typically used at 0.1 to 5% of the final ink formulation based on the total weight of all components in the ink. Higher levels of polymer (up to 20%) may be added, but this generally results in an ink with a viscosity unsuitable for most conventional applications. Pigment dispersions may be made by mixing pigment, dispersant, water, and optional additives and milling the whole in a suitable device used to reduce the pigment particle size. Such devices may include horizontal media mills, vertical media mills, attritor mills and the like.

Various additives may be used in the ink formulation to modify the ink properties to make the ink suitable for the ink jet printing process. Such additives may include humectants, penetrants, co-solvents, viscosity modifiers, surfactants, defoamers, biocides and the like. Additives are generally dictated by the requirements of the specific ink and are used to modify such properties of the ink as surface tension and viscosity as well as prevention of nozzle clogging at the printhead.

Preferably, a humectant is used in forming the ink in order to keep the ink from drying out during application. The amount of humectant used is determined by the properties of the ink and may range from 1 to 30%, preferably from 5 to 15% by weight, based on the total weight of all the components in the ink. Examples of commonly used humectants useful in forming the ink are: glycols, polyethylene glycols, glycerol, ethanolamine, diethanolamine, alcohols, and pyrrolidones. Other humectants known in the art may be used as well.

The use of suitable penetrants will depend on the specific application of the ink. Useful examples include pyrrolidone, and N-methyl-2-pyrrolidone.

The amount of defoaming agent in the ink, if used, will typically range from 0.05 to 0.5% by weight, and is more typically 0.1 wt. %. The amount required depends on the process used in making the pigment dispersion component of the ink. Defoaming agents useful in forming aqueous dispersions of pigments are well known in the art and commerically available examples include Surfynol 104H and Surfynol DF37 (Air Products, Allentown, Pa.) and Deefo PI-35 (Ultra Additives, Patterson, N.J.).

The remaining portion of the ink is generally water. The amount of water preferably is from 65 to 90% by weight, more preferably from 75 to 85% by weight, based on the total weight of all the components in the ink.

The ink compositions using the binders of the present invention may be prepared by any method known in the art for making such compositions, for example, by mixing, stirring or agitating the ingredients together using any art recognized technique to form an aqueous ink. The procedure for preparation of the ink composition of the present invention is not critical except to the extent that the ink composition is homogenous.

It is expected that the ink compositions using the binders of the present invention would include any additives necessary to obtain the desired physical properties required for the end use of the ink composition such additives include chelating agents, buffers, biocides, fungicides, bacteriocides, surfactants, anti-curling agents, anti-bleed agents and surface tension modifiers, all as discussed above. Typical ink compositions include the following formulations:

Ink Composition 1:
    4% colorant (1.2% self dispersed carbon black and 2.8% carbon black dispersant mixture)
    0.5% polymeric binder (Tg −10° C., average particle size 285 nm, 1.3% acid level)
    15% humectant (7.5% polyethylene glycol 400 and 7.5% 2-pyrrolidone)
    0.75% terpolymer dispersant
    0.75% penetrant (hexyl carbitol)
    balance deionized water Ink Composition 2
    4% colorant-dispersant mixture (mixture of carbon black and terpolymer dispersant)
    3% polymeric binder (Tg −10° C., average particle size 285 nm, 1.3% acid level)
    15% humectant (5% polyethylene glycol 1000, 5% 2,2-thiodiethanol and 5% 2-pyrrolidone)
    1% penetrant (1,2-hexanediol)
    balance deionized water Ink Composition 3
    2.25% colorant-dispersant mixture (Toyo cyan pigment and terpolymer dispersant)
    3% polymeric binder (Tg −10° C., average particle size 285 nm, 1.3% acid level)
    20% humectant (10% polyethylene glycol 400 and 10% 2,2-thiodiethanol)
    1% penetrant (1,2-hexanediol)
    balance deionized water The resistance of ink compositions comprising the polymeric binders of the present invention to wet rub and highlighter smear was evaluated in comparison to ink compositions comprising conventional binder. Resistance to wet rub was determined by visual comparison or by using a commercially available densitometer to measure the optical density of the residual ink on a wet cloth that was rubbed over the printed substrate. Resistance to highlighter smearing was similarly measured by assessing the optical density of the trailing edge of a highlighter mark after passing over the printed substrate into an unprinted area of the substrate. Printhead ejection maintenance was judged by the number of clogged printhead nozzles after printing 90 pages.

All ranges disclosed herein are inclusive and the minimums and maximums of the nested ranges are combinable.

The invention may be illustrated, in certain embodiments, through the following examples:

EXAMPLE 1

A sample of binder of the general composition ethyl acrylate (EA), styrene (STY), and methacrylic acid (MAA) was prepared as follows. After heating a reaction vessel containing 400 ml deionized, buffered water (0.06 mmol buffer/gm of water) and 2.1 g sodium lauryl sulfate (SLS) to 88° C., 4% of a mixture of 488 g water, 6 g SLS, 714 g EA, 234 g STY and 12.2 g MAA was added with 2.7 g sodium persulfate (NaPS) in 12 g of water. This combination was held at 88° C. for 10 minutes. Then, the remaining monomer mix was added over a period of 180 minutes, with a cofeed of 1.0 g sodium persulfate in 50 ml water at a rate such that the addition period was 185 minutes.

After the cofeed addition was completed, the vessel was held at 88° C. for 30 minutes and then cooled. The product was then filtered through 100 and 325 mesh screens. The filtered product was neutralized by combining 865 g of unneutralized product with 735.2 g deionized water and neutralized to pH 8.5 with 10% potassium hydroxide. The average particle size was 280 nm with a particle size distribution ranging from 175 nm to 400 nm. The calculated Tg was approximately 13° C.

EXAMPLE 2

A sample of butyl acrylate (BA), methyl methacrylate (MMA), and MAA polymer was prepared according to the procedure in Example 1 except that the monomer mixture consisted of 28.1 g MAA, 663.1 g MMA, 1468.8 g BA and 10.5 g SLS. In this case, a reaction vessel containing 1130 g deionized, buffered water (0.06 mmol buffer/g water) and 4.0 g SLS was heated to 81° C. Then 115.0 g of the monomer mix with a 20 g water rinse was added to the vessel followed by 5.6 g NaPS dissolved in 25 g of water. This combination was held at 81° C. for 10 minutes and then the remaining monomer mixture was added over 180 minutes along with an additional 16.5 g SLS and a co-feed of 2.2 g NaPS in 100 g of water (added over 185 minutes). After the co-feed was completed, the reaction was held at 81° C. for 30 minutes. Then the product was cooled, filtered and neutralized with the neutralization accomplished by combining 1760 g of unneutralized product with 1470 g deionized water and brought to a pH of 8.5 with KOH. The resultant polymer had an average particle size of 286 nm with a particle size distribution ranging from 174 nm to 408 nm. The calculated Tg was 0° C. In an assessment of printability, a sample ink containing 3.0% by weight of the polymer was used to print 90 pages on a Lexmark desktop printer. On the 90$^{th}$ page of this print test which was repeated four times, an average of 3 nozzles in the ink cartridge had misfired. Performance in terms of wet-rub smear or resistance to smearing by highlighter pens was excellent with little or no smearing evident.

EXAMPLE 3

A sample of butyl acrylate (BA), methyl methacrylate (MMA), and acrylic acid (AA) polymer was prepared according to the procedure in Example 2 except that the monomer mixture consisted of 23.5 g AA, 667.7 g MMA, 1468.8 g BA and 10.5 g SLS. In this case, a reaction vessel containing 1130 g deionized, buffered water and 3.0 g SLS was heated to 81° C. The remaining monomer mix, NaPS, as well as an additional 17.5 g of SLS were fed to the vessel after the initial addition of the mixture. Following neutralization, the resultant polymer had an average particle size of 348 nm with a particle size distribution ranging from 231 nm to 480 nm. The calculated Tg of this polymer was 0° C. Performance in terms of wet-rub smear or resistance to smearing by highlighter pens was excellent with little or no smearing evident.

EXAMPLE 4

A sample of butyl acrylate (BA), methyl methacrylate (MMA), and methacrylic acid (MAA) polymer was prepared according to the procedure in Example 2 with the same monomer mixture which consisted of 28.1 g MAA, 663.1 g MMA, 1468.8 g BA and 10.5 g SLS. In this case, a reaction vessel containing 1130 g deionized, buffered water and 3.0 g SLS was heated to 81° C. The remaining monomer mix, NaPS, as well as an additional 17.5 g of SLS were fed to the vessel after the initial addition of the mixture. Following neutralization, the resultant polymer had an average particle size of 301 nm with a particle size distribution ranging from 184 nm to 430 nm. The calculated Tg of this polymer was 0° C. In an assessment of printability, a sample ink containing 3.0% by weight of the polymer was used to print 90 pages on a Lexmark desktop printer. On the 90$^{th}$ page of this print test which was repeated three times, an average of 22 nozzles in the ink cartridge had misfired. Performance in terms of wet-rub smear or resistance to smearing by highlighter pens was excellent with little or no smearing evident.

EXAMPLE 5

A sample of butyl acrylate (BA), methyl methacrylate (MMA), and methacrylic acid (MAA) polymer was prepared according to the procedure in Example 2 with the same monomer mixture which consisted of 28.1 g MAA, 663.1 g MMA, 1468.8 g BA and 10.5 g SLS. In this case, a reaction vessel containing 1130 g deionized, buffered water and 5.0 g SLS was heated to 81° C. The remaining monomer mix, NaPS, as well as an additional 15.5 g of SLS were fed to the vessel after the initial addition of the mixture. Following neutralization, the resultant polymer had an average particle size of 254 nm with a particle size distribution ranging from 165 nm to 341 nm. The calculated Tg of this polymer was 0° C. Performance in terms of wet-rub smear or resistance to smearing by highlighter pens was good with little smearing evident and no clogging of the printhead nozzles was observed.

EXAMPLE 6

A sample of butyl acrylate (BA), methyl methacrylate (MMA), and methacrylic acid (MAA) polymer was prepared according to the procedure in Example 2 with a monomer mixture which consisted of 43.2 g MAA, 648.0 g MMA, 1468.8 g BA and 10.5 g SLS. In this case, a reaction vessel containing 1130 g deionized, buffered water and 5.0 g SLS was heated to 81° C. The remaining monomer mix, NaPS, as well as an additional 15.5 g of SLS were fed to the vessel after the initial addition of the mixture. Following neutralization, the resultant polymer had an average particle size of 238 nm with a particle size distribution ranging from 133 nm to 340 nm. The calculated Tg of this polymer was 0° C. Performance in terms of wet-rub smear or resistance to smearing by highlighter pens was good with little smearing evident and only nominal clogging of the printhead nozzles was observed.

COMPARATIVE EXAMPLE 1

A sample of butyl acrylate (BA), methyl methacrylate (MMA), and MAA polymer was prepared by reacting a monomer mixture which consisted of 28.1 g MAA, 663.1 g MMA, 1468.8 g BA and 15.5 g SLS. A reaction vessel containing 1130 g deionized, buffered water (0.06 mmol buffer/g water) was heated to 81° C. Then 115.0 g of the monomer mix with a 20 g water rinse was added to the vessel followed by 5.6 g NaPS dissolved in 25 g of water. This combination was held at 81° C. for 10 minutes and then the remaining monomer mixture was added over 180 minutes along with an additional 15.5 g SLS and a co-feed of 2.2 g NaPS in 100 g of water (added over 185 minutes). After the co-feed was completed, the reaction was held at 81° C.

for 30 minutes. Then the product was cooled, filtered and neutralized with the neutralization accomplished by combining 1760 g of unneutralized product with 1470 g deionized water and brought to a pH of 8.5 with KOH. The resultant polymer was bimodal with modes of average particle size of 177 nm and 398 with an overall particle size distribution ranging from 87 nm to 508 nm. The calculated Tg was 0° C. In an assessment of printability, a sample ink containing 3.0% by weight of the polymer was used to print 90 pages on a Lexmark desktop printer. On the 90$^{th}$ page of this print test which was repeated three times, an average of 202 nozzles in the ink cartridge had misfired. This performance was deemed unacceptable.

COMPARATIVE EXAMPLE 2

A sample of butyl acrylate (BA), methyl methacrylate (MMA), and methacrylic acid (MAA) polymer was prepared according to the procedure in Comparative Example 1 except that the monomer mixture consisted of 28.1 g MAA, 1591.9 g MMA, 540.0 g BA and 10.5 g SLS. In this case, a reaction vessel containing 1130 g deionized, buffered water and 4.0 g SLS was heated to 81° C. The remaining monomer mix, NaPS, as well as an additional 16.5 g of SLS were fed to the vessel after the initial addition of the mixture. Following neutralization, the resultant polymer had an average particle size of 316 nm with a particle size distribution ranging from 181 nm to 471 nm. The calculated Tg of this polymer was 50° C. In an assessment of printability, an ink containing 3.0% of this polymer was found to have acceptable performance in terms of low number of missing nozzles after 90 pages, but unacceptable performance in terms of wet-rub smear or resistance to smearing by highlighter pens.

COMPARATIVE EXAMPLE 3

A sample of butyl acrylate (BA), methyl methacrylate (MA), and methacrylic acid (MAA) polymer was prepared according to the procedure in Comparative Example 1 except that the monomer mixture consisted of 28.1 g MAA, 1915.9 g MMA, 216.0 g BA and 10.5 g SLS. In this case, a reaction vessel containing 1130 g deionized, buffered water and 4.0 g SLS was heated to 81° C. The remaining monomer mix, NaPS, as well as an additional 16.5 g of SLS were fed to the vessel after the initial addition of the mixture. Following neutralization, the resultant polymer had an average particle size of 317 nm with a particle size distribution ranging from 174 nm to 408 nm. The calculated Tg of this polymer was 70° C. In an assessment of printability, an ink containing 3.0% of this polymer was found to have acceptable performance in terms of low number of missing nozzles after 90 pages, but unacceptable performance in terms of wet-rub smear or resistance to smearing by highlighter pens.

What is claimed is:

1. A polymeric binder comprising a polymer having a glass transition temperature in the range from −20° C. to 25° C., an average particle diameter in the range from 250 to 400 nm, a particle size distribution such that essentially all the particles have a diameter in the range from 130 to 450 nm and an acid component present in a range from 1 to 10 wt % of the polymer.

2. The binder of claim 1 wherein the acid component is present in a range from 1 to 3 wt. % of the binder.

3. The binder of claim 1 wherein the acid component is selected from the group consisting of acrylic acid, methacrylic acid, itaconic acid, maleic acids, vinylsulfonic acid, and acid derived from methacrylic anhydride, maleic anhydride, sodium vinylsulfonate, acrylamidopropane sulfonate, and combinations thereof.

4. A polymer emulsion useful as a binder in inkjet inks comprising
   (a) one or more monomers selected from the group consisting of acrylates, methacrylates, styrene, substituted stryene, fluoromethacrylates, vinyl acrylates, vinyl acetates, acrylamides, substituted acrylamides, methacrylamides, and substituted methacrylamides, and
   (b) an acid component selected from the group consisting of acrylic acid, methacrylic acid, itaconic acid, maleic acids, vinylsulfonic acid, and acid derived from methacrylic anhydride, maleic anhydride, sodium vinylsulfonate, acrylamidopropane sulfonate, and combinations thereof, wherein the acid component is present in a range from 1 to 10 wt.% of the polymer; wherein the polymer has a glass transition temperature in the range from −20° C. to 25° C., and an average particle diameter in the range from 250 to 400 nm, and a particle size distribution such that essentially all the particles have a diameter in the range from 130 to 450 nm.

5. The polymer of claim 4 wherein the acid component comprises acrylic acid or methacrylic acid or a combination thereof.

6. The polymer of claim 4 wherein the polymer comprises acid component in the range from 1 to 3 wt. % of the polymer.

7. An ink binder comprising a polymer consisting essentially of:
   (a) one or more monomers selected from the group consisting of acrylates, methacrylates, styrene, substituted stryene, fluoromethacrylates, vinyl acrylates, vinyl acetates, acrylamides, substituted acrylamides, methacrylamides, and substituted methacrylamides, and
   (b) an acid component selected from the group consisting of acrylic acid, methacrylic acid, itaconic acid, maleic acids, vinylsulfonic acid, and acid derived from methacrylic anhydride, maleic anhydride, sodium vinylsulfonate, acrylamidopropane sulfonate, and combinations thereof, wherein the acid component is present in a range from 1 to 3 wt. % of the polymer; wherein the polymer has a glass transition temperature in the range from −20° C. to 25° C., a particle size distribution such that essentially all the particles have a diameter in the range from 130 to 450 nm and an average particle diameter in the range from 250 to 400 nm.

8. The binder of claim 7 wherein the acid component is acrylic acid or methacrylic acid, or combinations thereof.

* * * * *